United States Patent
Puckett et al.

(10) Patent No.: US 6,857,615 B2
(45) Date of Patent: Feb. 22, 2005

(54) MECHANICAL DAMPING SYSTEM FOR STRUCTURES

(75) Inventors: Jay A. Puckett, Laramie, WY (US); Patrick S. McManus, Cheyenne, WY (US); Homer R. Hamilton, III, Gainesville, FL (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 10/306,239

(22) Filed: Nov. 27, 2002

(65) Prior Publication Data

US 2003/0102420 A1 Jun. 5, 2003

Related U.S. Application Data

(60) Provisional application No. 60/334,073, filed on Nov. 30, 2001.

(51) Int. Cl.$^7$ ................................................ F16M 13/00
(52) U.S. Cl. ........................ 248/548; 248/559; 248/214; 248/228.5; 248/230.5
(58) Field of Search .................................. 248/548, 559, 248/214, 218.4, 219.1, 228.1, 228.5, 230.5, 230.1

(56) References Cited

U.S. PATENT DOCUMENTS

| | | | | |
|---|---|---|---|---|
| 3,910,325 A | * | 10/1975 | Dixon | 81/57.37 |
| 4,500,064 A | * | 2/1985 | Calabro | 248/539 |
| 5,070,663 A | * | 12/1991 | Sakai et al. | 52/167.1 |
| 5,409,190 A | * | 4/1995 | Mattox | 248/315 |

FOREIGN PATENT DOCUMENTS

| | | | | |
|---|---|---|---|---|
| JP | 03013673 A | * | 1/1991 | |
| JP | 03138568 A | * | 6/1991 | ........... G01P/15/02 |

OTHER PUBLICATIONS

H.R. Hamilton et al, *Increased Damping in Cantilevered Traffic Signal Structures*, Oct. 13, 1998.
Univ. of Florida, *Clearwater, Florida Free Vibration Pull Down Tests*, Jul. 8, 1999.
H.R. Hamilton et al, *Signal Structures*, Journal of Structural Engineering, Apr. 2000, pp. 530–537.
P.S. McManus et al, *Damping in Cantilevered Traffic Signal Structures under Forced Vibration*.
G. Scott Riggs, *Increased Damping in Cantilevered Traffic Signal Structures*, 10/98.
R.A. Cook et al, *Mechanical Damping Systems for Traffic Signal Mast Arms*, 10/98.

* cited by examiner

*Primary Examiner*—Korie Chan
(74) *Attorney, Agent, or Firm*—Emery L. Tracy

(57) ABSTRACT

A mechanical damping system for a structure is provided. The mechanical damping system comprises a tubular impact frame secured to the structure. A support frame is secured to the structure with the support frame spaced from the impact frame. An elongated member is provided having a first end and a second end. The first end is secured within the support frame and the second end is free from connection and extends into the impact frame. At least one impact mass is secured to the second end of the elongated member, the impact mass movable within and contactable with the impact frame.

62 Claims, 10 Drawing Sheets

*Cantilevered Traffic Signal Structure*

*Figure 1 – Cantilevered Traffic Signal Structure*

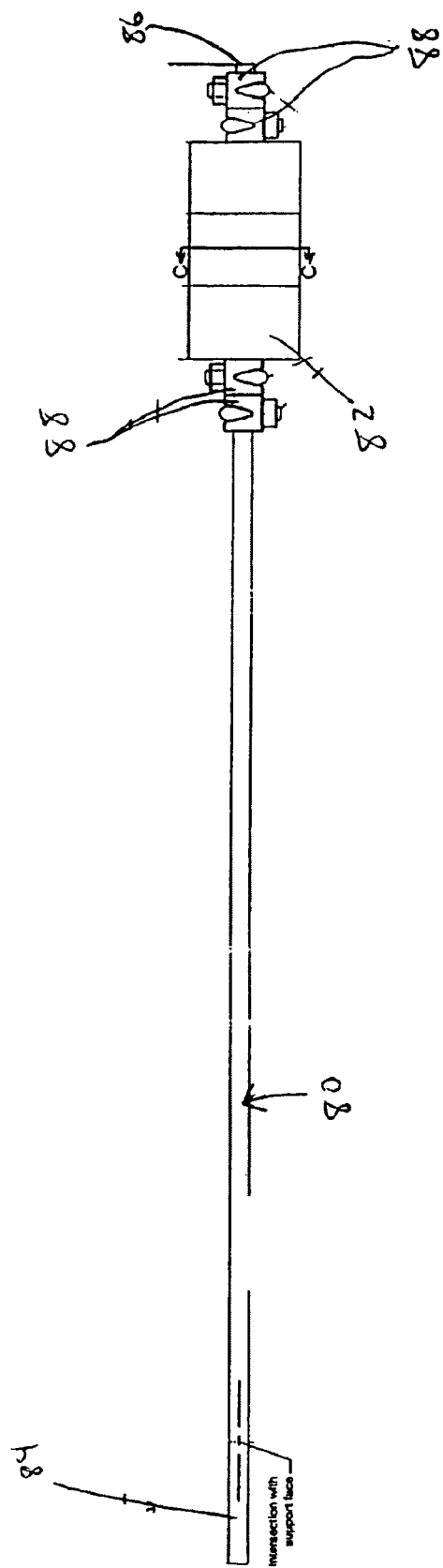
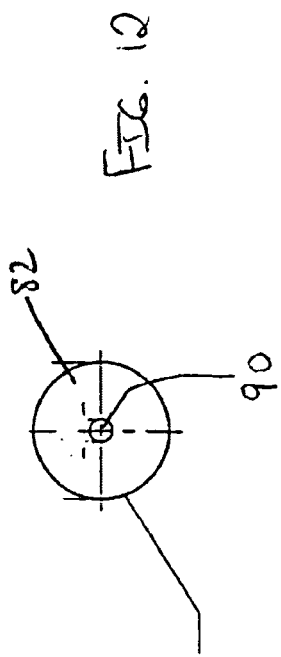
FIG. 11
FIG. 12

MECHANICAL DAMPING SYSTEM FOR STRUCTURES

The inventors of the present application are claiming priority of pending provisional patent application Ser. No. 60/334,073, filed on Nov. 30, 2001, entitled "Mechanical Damping System for Traffic Signal Mast Arms".

BACKGROUND OF THE INVENTION

1. Field of the Invention

This invention relates generally to mechanical dampers for cantilevered structures and, in particular, it relates to a tuned-mass strand-impact damper which mitigates vibrations in cantilevered traffic signal structures.

2. Description of the Prior Art

The fatigue resistance of traffic and sign structures across the U.S. in recent years has become a concern. A number of sign and signal fatigue failures have occurred as a result of the large number of stress cycles caused by wind-induced vibrations. Sign and signal structures are generally light and have low inherent damping. Traffic signal structures, in particular, have a low fundamental period of vibration, contributing to aeroelastic phenomenon such as galloping or vortex shedding. Galloping can cause large vertical displacements in relatively mild wind.

Two traffic signal structures recently collapsed in Wyoming. The collapse was the result of a fracture at the connection between the cantilever signal light support arm (mast arm) and the pole connected to the foundation. The Wyoming Department of Transportation (WYDOT) has confirmed (through an inspection of the failed connections) that the traffic pole failed at the toe of the welds as a result of fatigue cracking. The structures did not fail under an extreme-event wind, and the fatigue crack growth was most likely caused by vibrations at lower wind speeds. Recent research has indicated that these vibrations may be caused by galloping of the cantilever pole during wind speeds in the range of ten (10 mph) miles per hour to thirty (30 mph) miles per hour. These wind speeds were also found to cause vibrations with cantilever tip amplitudes of eight (8 in.) inches to eighteen (18 in.) inches in a full-scale test specimen (with a forty-eight (48 ft.) foot cantilever) subjected to actual wind conditions of ten (10 mph) miles per hour to thirty (30 mph) miles per hour.

WYDOT visual inspections of approximately eight hundred and forty (840) poles indicated that roughly one-third (⅓) of the poles inspected have fatigue cracks ranging in length from one-quarter (¼ in.) inch to twenty (20 in.) inches around the box connection between the pole and mast arm. Because visual inspection only indicates cracks that have propagated to the surface, the damage is likely more significant than these numbers suggest.

In the past, a tuned-mass and impact damper combination was created by supporting a mass with a short section of prestressing strand with the prestressing strand acting as a spring for the mass. The length of strand was adjusted so that the natural frequency of the damper was close to that of the in-plane mode of the structure. The impact mass was centered between horizontally positioned steel impact plates on the top and bottom and vertically positioned threaded rods on the sides. The distance between the impact plates was adjusted to maximize the damping provided.

Unfortunately, with the horizontally positioned impact plates and the vertically positioned threaded rods, the tuned-mass and impact damper combination of the prior art did not provide equal stiffness in all directions thereby adversely affecting the dampening of the structure in certain directions. Furthermore, tuning this tuned-mass and impact damper combination was very difficult and matching the natural frequency of the structure was extremely difficult.

SUMMARY

The mechanical damping system of the present invention operates as a tuned-mass damper under relatively low excitation of the primary (or attached) structure, and as a tuned-mass and impact damper when high excitation and resulting responses are present.

The present invention is a mechanical damping system for a structure. The mechanical damping system comprises a tubular impact frame secured to the structure. A support frame is secured to the structure with the support frame spaced from the impact frame. An elongated member is provided having a first end and a second end. The first end is secured within the support frame and the second end is free from connection and extends into the impact frame. At least one impact mass is secured to the second end of the elongated member, the impact mass movable within and contactable with the impact frame.

In addition, the present invention includes a damping device for omni directional damping of movement of a structure. The damping device comprises an impact frame secured to the structure and providing substantially uniform stiffness characteristics and impact properties in in-plane and out-of-plane directions. A cantilevered prestressed damping mechanism counters movement of the structure. The prestressed damping mechanism is secured on a first end and free from contact on a second end which is contactable with the impact frame upon movement of the structure.

The present invention further includes a method for damping the movement of a structure in both in-plane and out-of-plane directions. The method comprises securing an impact frame to the structure with the impact frame having substantially uniform stiffness characteristics and impact properties in in-plane and out-of-plane directions, providing a prestressed damping mechanism with the prestressed damping mechanism having a first end and a second end, securing the first end of the prestressed damping mechanism to the structure, allowing the second end of the prestressed damping mechanism to move into and out of contact with the impact frame, and countering movement of the structure with movement of the prestressed damping mechanism, the second end of the prestressed damping mechanism contactable with the impact frame.

It is an object of the present invention to provide a dampening mechanism for structures.

It is a further object of the present invention to provide a dampening mechanism for structures having a substantially vertical pole with a laterally extending mast arm secured thereto.

It is still a further object of the present invention to provide a dampening mechanism for a structure which does not exhibit objectionably loud noises.

It is yet a further object of the present invention to provide a dampening mechanism for a structure which is aesthetically pleasing.

It is still yet a further object of the present invention to provide a dampening mechanism which is easy to install and maintain.

In addition, it is an object of the present invention to provide a dampening mechanism which has increased tuning capabilities for matching the natural frequency of the structure.

BRIEF DESCRIPTION OF THE DRAWINGS

It should be noted that each drawing is to scale, but not the same scale for each drawing.

FIG. 11 is a sectional view illustrating the strand and mass of the mechanical damping system taken along line C—C in FIG. 10, constructed in accordance with the present invention;

FIG. 12 is a side view illustrating the preliminary side panels of the mechanical damping system, constructed in accordance with the present invention;

DETAILED DESCRIPTION OF THE PREFERRED EMBODIMENTS

Figure 1:
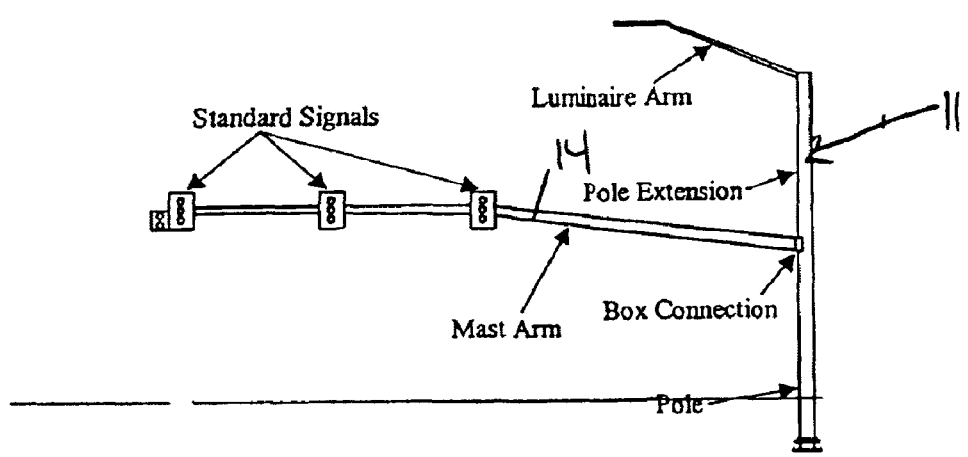
FIG. 1 is an end view illustrating an impact frame of a mechanical damping system, constructed in accordance with the present invention.

As illustrated in FIGS. 1–16, the present invention is a mechanical damping system, indicated generally at 10, for increasing damping in traffic signal pole structures 11. It has been shown that an increase in the inherent damping of traffic signal structures 11 decreases the magnitude and total number of wind-induced oscillations of the traffic signal structures 11. Consequently, by increasing damping, the magnitude of the fatigue stress and the number of fatigue cycles of the traffic signal structure 11 are decreased, thereby extending the service life of the structure 11. The mechanical damping system 10 of the present invention operates as a tuned-mass damper under relatively low excitation of the retrofit structure, and as a tuned-mass and impact damper when high excitation and resulting responses are present.

While being described hereto and hereafter as increasing the damping of traffic signal structures 11, the mechanical damping system 10 of the present invention can be added to any structural system, either horizontal or vertical, besides traffic signal pole structures, to increase the overall damping.

The mechanical damping system 10 of the present invention is omni-directional in that the performance and behavior of the mechanical damping system 10 is independent of the direction of movement of the traffic signal structure 11. The mechanical damping system 10 has increased tuning capabilities for matching the natural frequency of the damped-tuned-mass system to the traffic signal structure 11, in part due to the increased stiffness of the support frame, as will be described below.

The mechanical damping system 10 of the present invention includes a support frame 12 for securement to a mast arm 14 of the traffic signal structure 11. The support frame 12 has at least one curved rod member 16 having a first end 18 and a second end 18 and at least one bent frame member 22 having a first leg member 24 and a second member 26. Each curved rod member 16 is preferably constructed from a five-eighths (⅝") inch threaded steel rod having a curve substantially similar to the curved outer surface of the mast arm 14. Each bent frame member 22 is preferably constructed from a one-half (½") inch steel plate having a width of approximately three (3") inches although constructing the bent frame member 22 with different dimensions is within the scope of the present invention.

Preferably, the first leg member 24 of the bent frame member 22 has a length of approximately eight (8") inches and the second leg member 26 of the bent frame member 22 has a length of approximately eight (8") inches although having the first leg member 24 and/or the second leg member 26 with a length greater than or less than eight (8") inches are within the scope of the present invention. Furthermore, while the curved rod member 16 and the bent frame member 22 have been described as being constructed from a steel material, it is within the scope of the present invention to construct the curved rod member 16 and/or the bent frame member 22 from other materials including, but not limited to, plastic, fiberglass, nylon, resin, wood, etc.

The first leg member 24 of the bent frame member 22 has a first slot 28 and a first aperture 30 and the second leg member 26 of the bent frame member 22 has a second slot (not shown) and a second aperture (not shown). The first slot 28 of the first leg member 24 receives the first end 18 of the curved rod member 16 and the second slot of the second leg member 26 receives the second end 20 of the curved rod member 16. A first nut 36 is threadably received on the first end 18 of the curved rod member 16 against the first leg member 24 of the bent frame member 22.

A first bolt 38 is inserted into the first aperture 30 of the first leg member 24 into an aperture 40 formed in the mast arm 14 of the traffic signal structure 11. The first bolt 38 is secured therein in a known manner by threads, nut, and/or the like to secure the bent frame member 22 to the mast arm 14.

Figure 2:
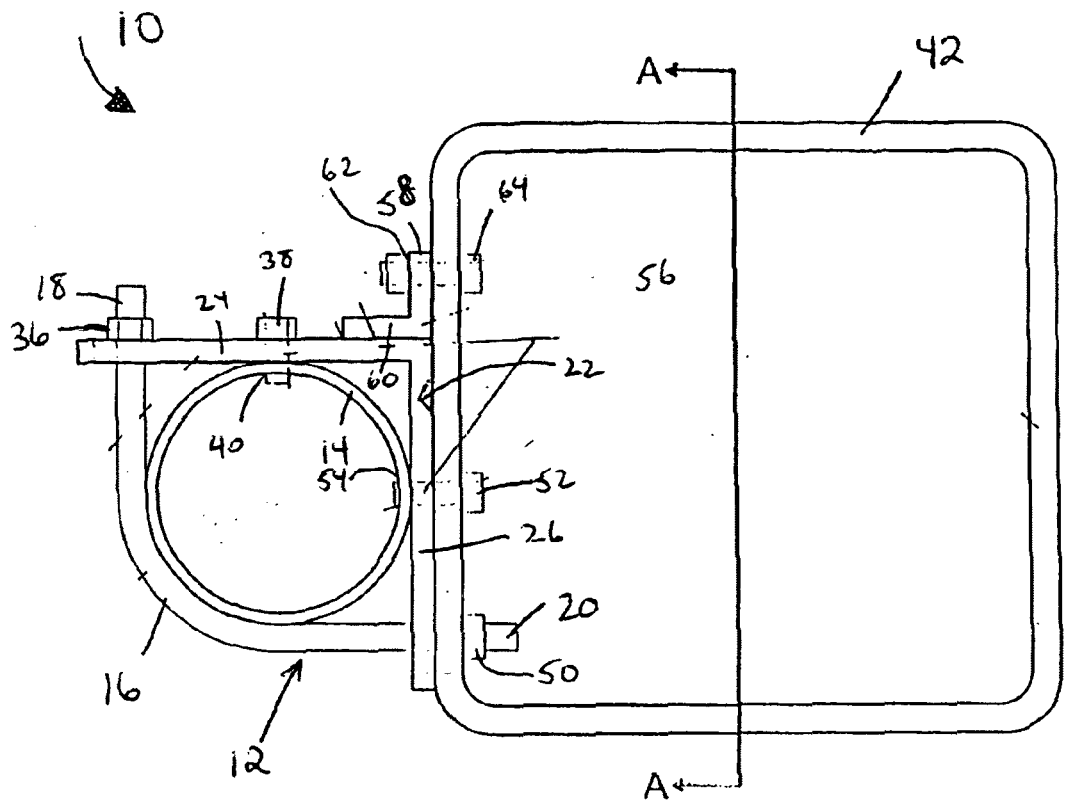
FIG. 2 is a top view illustrating the impact frame of the mechanical damping system, constructed in accordance with the present invention.
Figure 3:
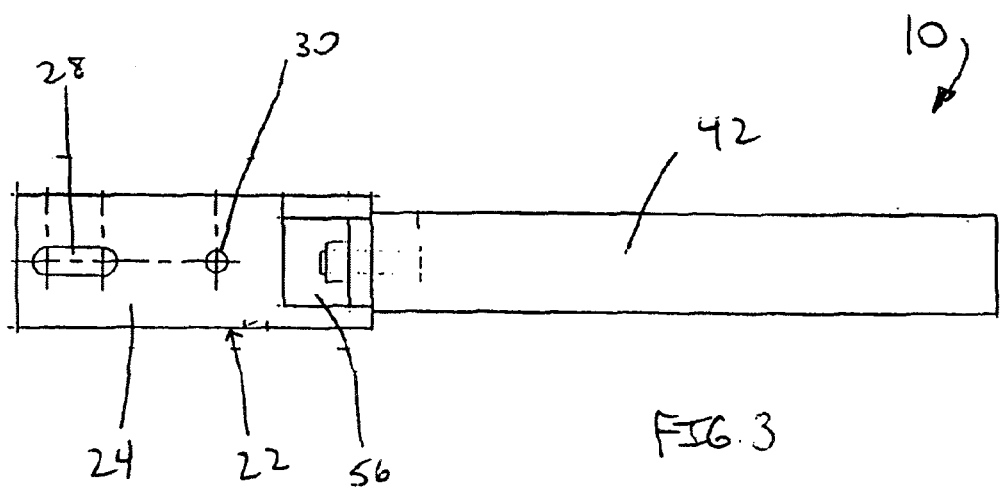
FIG. 3 is a sectional view illustrating the impact frame of the mechanical damping system taken along line A—A of FIG. 1, constructed in accordance with the present invention.
Figure 4:
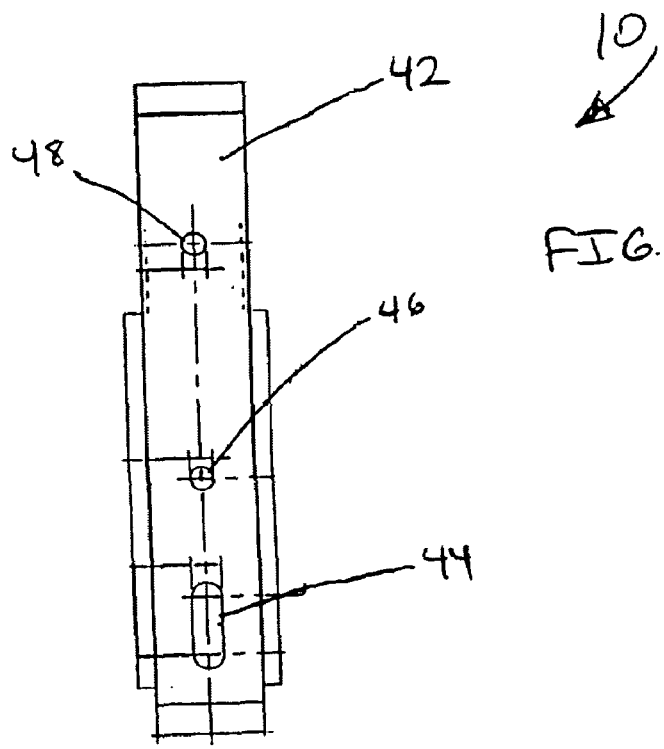
FIG. 4 is an end view of a support frame—mast arm of the mechanical damping system, constructed in accordance with the present invention.

As illustrated in FIGS. 2–4, the mechanical damping system 10 of the present invention further includes an impact frame 42 secured to the support frame 12. The impact frame 42 can have a rectangular cross-sectional configuration or a substantially rounded cross-sectional configuration. Preferably, the impact frame 42 has a thickness of approximately five-eighths (⅝") inch and a width of approximately two and one quarter (2¼") inches. In the rectangular cross-sectional configuration, the impact frame 42 is preferably constructed from a substantially square steel tube having a width of approximately fourteen (14") inches, and a length of approximately fourteen (14") inches, although a steel tube impact frame 42 having different dimensions are within the scope of the present invention. In the rounded cross-sectional configuration, the impact frame 42 is preferably constructed from a substantially round or oval steel tube having a diameter of approximately fourteen (14") inches. It should be noted that the cross-sectional configuration of the impact frame 42 can be selected from a variety of cross-sectional configurations including, but not limited to, square, rectangular, round, oval, etc.

The impact frame 42 of the mechanical damping system 10 includes a first impact slot 44, a first impact aperture 46, and a second impact aperture 48 formed in the impact frame 42. The second slot of the second leg member 26 of the bent frame member 22 and the first impact slot 44 of the impact frame 42 receive the second end 20 of the curved rod member 16. A second nut 50 is threadably received on the second end 20 of the curved rod member 16 against the impact frame 42.

A second bolt 52 is inserted into the second aperture of the second leg member 26 and the second impact aperture 48 of the impact frame 42 and into another aperture 54 formed in the mast arm 14 of the traffic signal structure 11. The second bolt 52 is secured therein in a known manner by threads, a nut, and/or the like to secure the bent frame member 22 and the impact frame 42 to the mast arm 14.

In addition, the mechanical damping system 10 of the present invention includes a corner stabilizing member 56 that is positioned upon the bent frame member 22 against the impact frame 42. The corner stabilizing member 56 has a first corner leg 58 and a second corner leg 60 with the first corner leg 58 and the second corner leg 60 each preferably having a length of approximately two (2") inches, a width of approximately two (2") inches, and a thickness of approximately one-half (½") inch, although having a first corner leg 58 and/or second corner leg 60 having a length greater than or less than approximately two (2") inches, a width greater than or less than approximately two (2") inches, and a thickness greater than or less than approximately one-half (½") inch is within the scope of the present invention.

The first corner leg 58 of the corner stabilizing member 56 includes a corner aperture 62 for receiving a corner bolt 58. The corner bolt 58 extends through the corner aperture 62 of the first corner leg 58 and through the second impact aperture 48 of the impact frame 42. The corner bolt 58 is secured therein by threading, a nut and/or other means. The second corner leg 60 of the corner stabilizing member 56 is preferably welded to the bent frame member 22.

Figure 5:
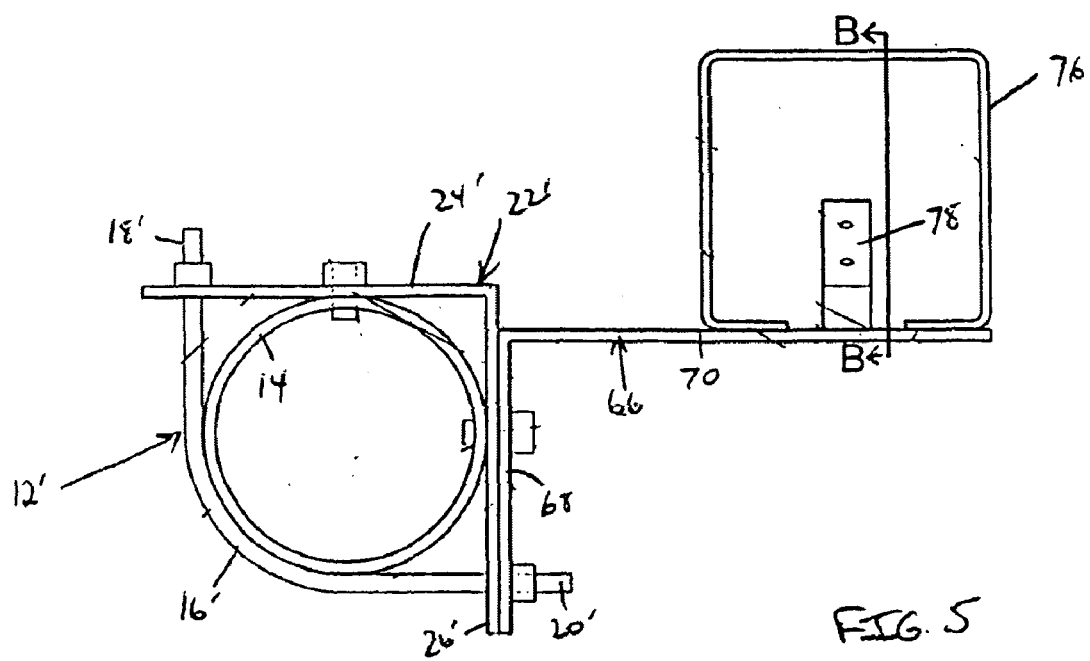
FIG. 5 is a top view illustrating the support frame—mast arm of the mechanical damping system, constructed in accordance with the present invention.
Figure 6:
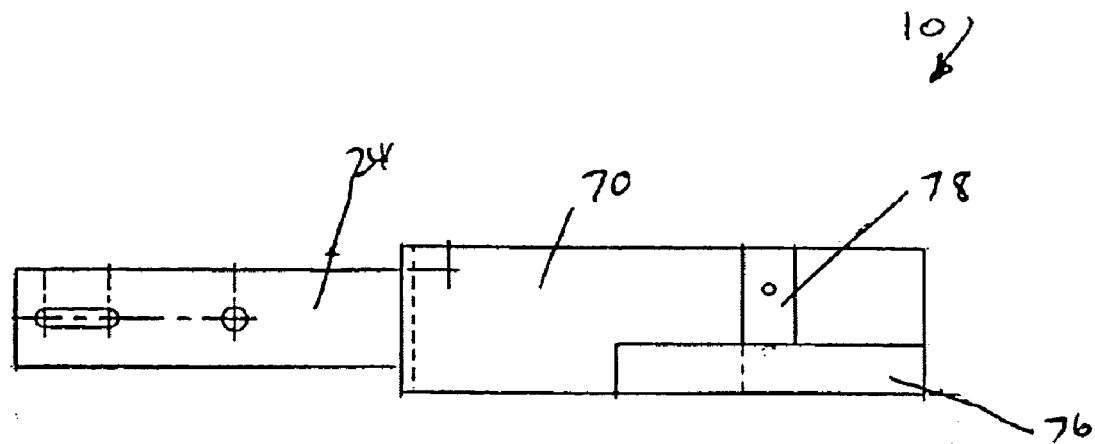
FIG. 6 is a sectional view illustrating the support frame—mast arm of the mechanical damping system taken along line B—B of FIG. 4, constructed in accordance with the present invention.
Figure 7:
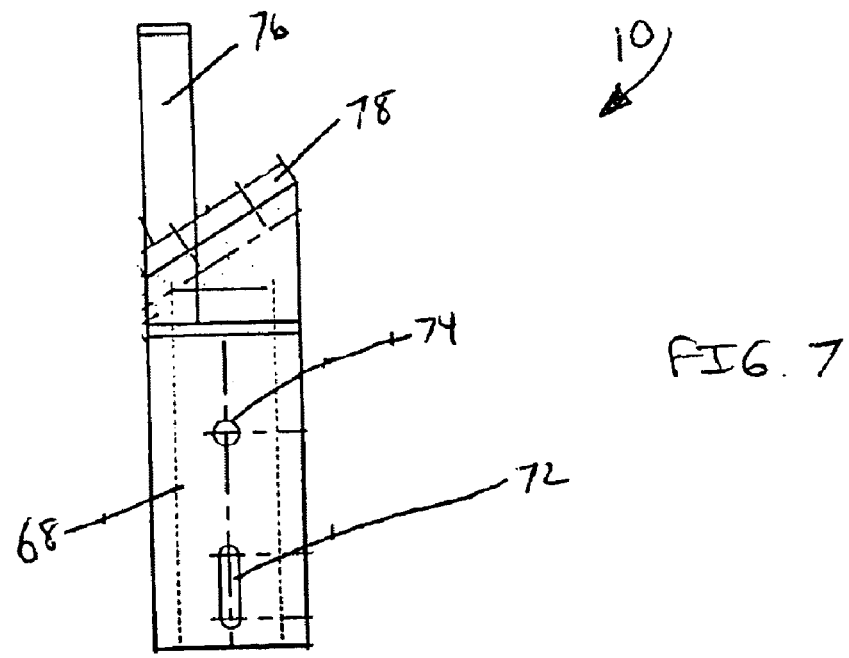
FIG. 7 is a side view illustrating a strand support of the mechanical damping system, constructed in accordance with the present invention.

Furthermore, as illustrated in FIGS. 5–7, the mechanical damping system 10 includes a second support frame 12' similar to the first support frame 12 secured to the mast arm 14. The second support frame 12' includes a curved rod member 16' having a first end 18' and a second end 20' and a bent frame member 22' having a first leg member 24' and a second leg member 26'. The curved rod member 16' and the bent frame member 22' are secured to the mast arm 14 in a similar manner to the first support frame as described above.

In addition, the second support frame 12' includes a support plate 66 having a first support arm 68 and a second support arm 70. Preferably, the support plate 66 is constructed from a steel material having a thickness of approximately one-quarter (¼") inch with the first support arm 68 having a length of approximately six and one-half (6½") inches and a width of approximately three (3") inches, and the second support arm 70 having a length of approximately ten and one-quarter (10¼") inches and a width of approximately three (3") inches. As understood by the person skilled in the art, constructing the support plate 66 from a different material with a thickness greater than or less than approximately one-quarter (¼") inch and the first support arm 68 and/or the second support arm 70 having lengths greater than or less than described above is within the scope of the present invention.

The first support arm 68 of the support plate 66 has a first support slot 72 and a first aperture 74. The first end 18' of the curved rod member 16' is inserted into the first slot 72 of the first support arm 68 and secured thereto with threading, a nut and/or the like thereby securing the support plate 66 to the mast arm 14.

The mechanical damping system 10 of the present invention further includes a structural tube 76 that is secured to the second support arm 70 of the support plate 66 by welding or other means. The structural tube 76 is preferably constructed from a steel material having a thickness of approximately three-sixteenths (³⁄₁₆") inch, a width of approximately six (6") inches, and a length of approximately six (6") inches, although constructing the structural tube 76 from a different material having different dimensions other than those herein described are within the scope of the present invention.

Figure 8:
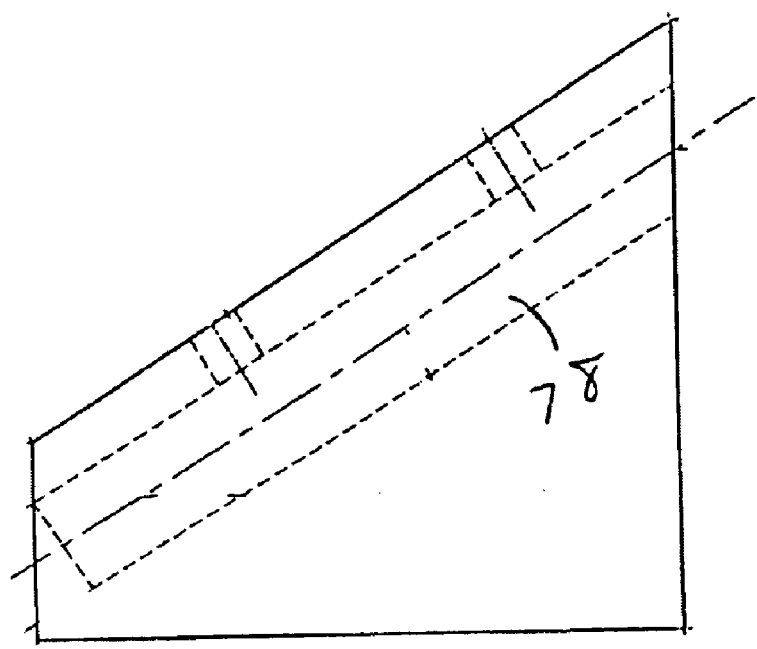
FIG. 8 is an end view illustrating the strand support of the mechanical damping system, constructed in accordance with the present invention.
Figure 9:
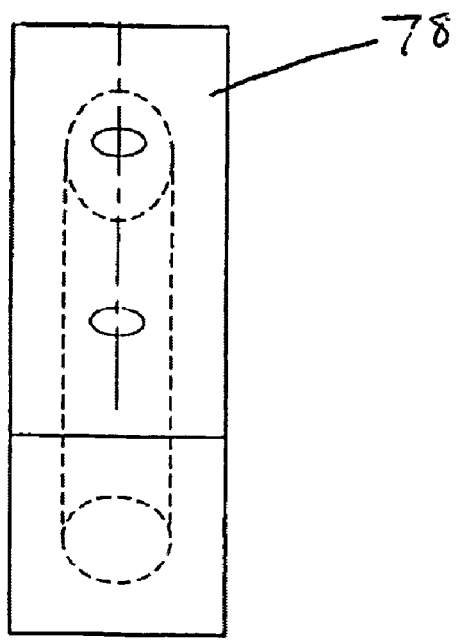
FIG. 9 is a side view illustrating the final assembly orientation of the mechanical damping system, constructed in accordance with the present invention.

As illustrated in FIGS. 8 and 9, the mechanical damping system 10 of the present invention includes a support 78 mounted to the second support arm 70 of the support plate 66 substantially within the structural tube 76. The support 78 is preferably mounted at an angle of inclination of approximately thirty-two (32°) degrees to provide optimal damping of the movement of the traffic signal structure 11. Other angles of inclination of the support 78 are within the scope of the present invention, as will be further understood from below.

Figure 10:
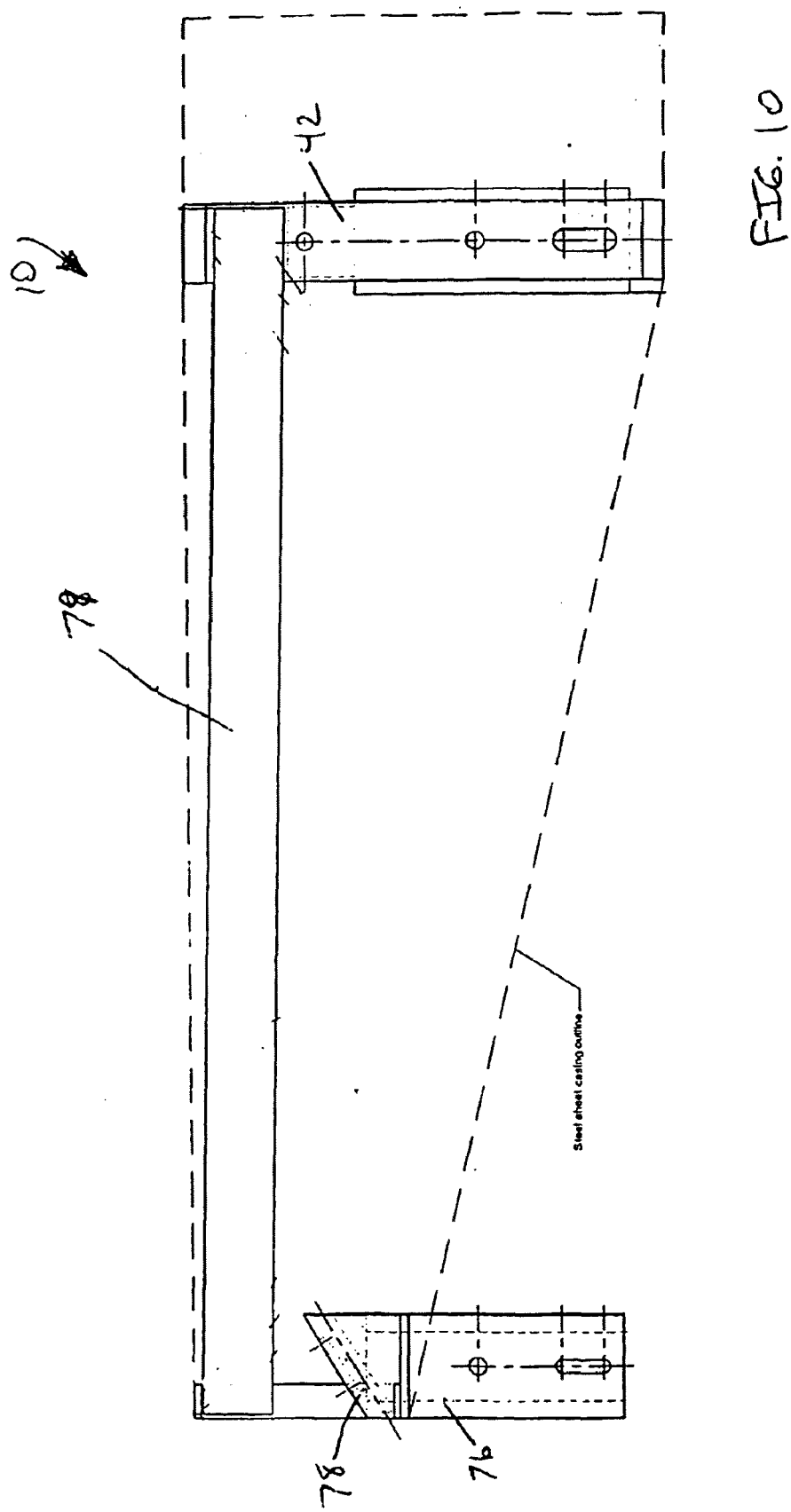
FIG. 10 is a side view of a strand and mass of the mechanical damping system, constructed in accordance with the present invention.
Figure 13:
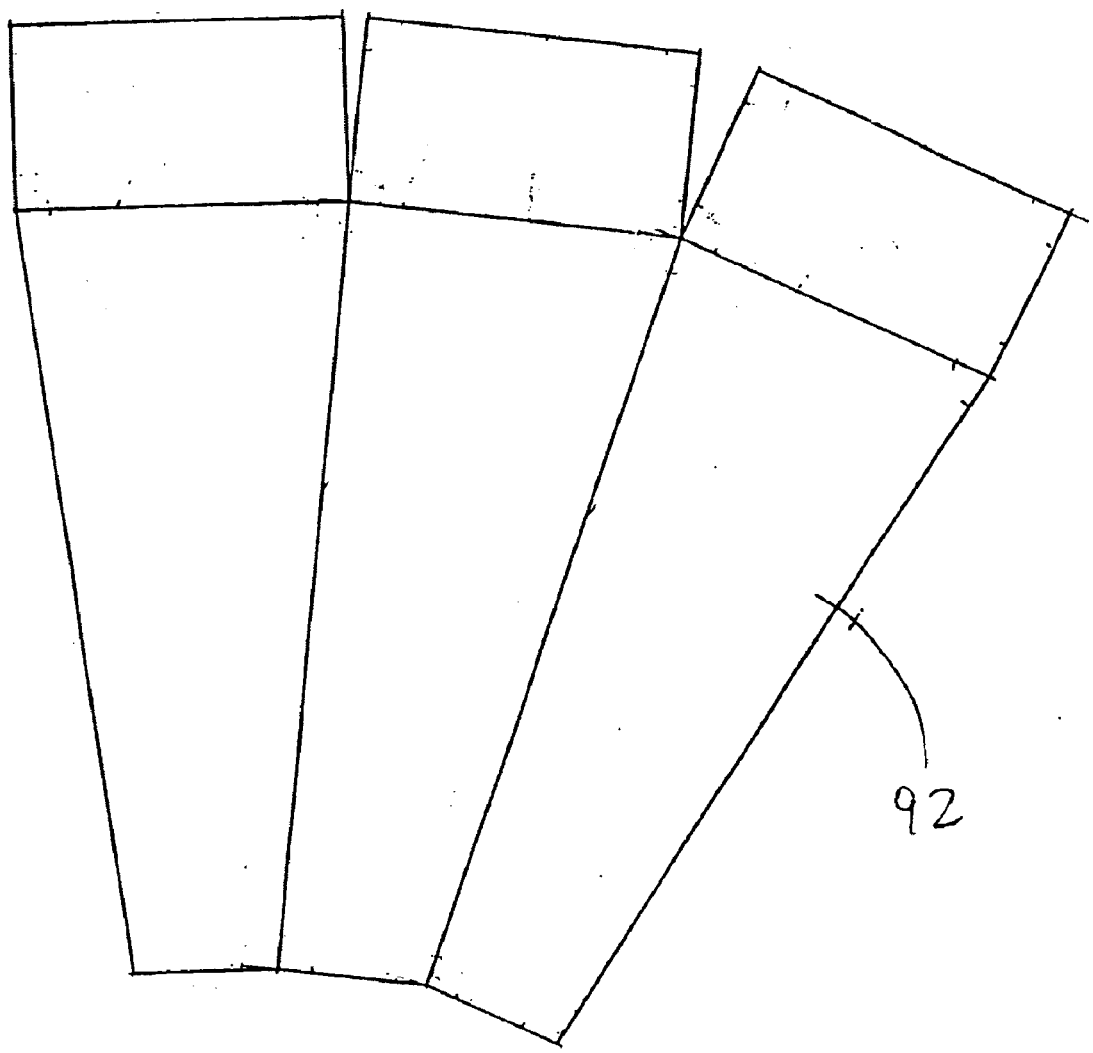
FIG. 13 is a side view illustrating the final side panels of the mechanical damping system, constructed in accordance with the present invention.
Figure 14:
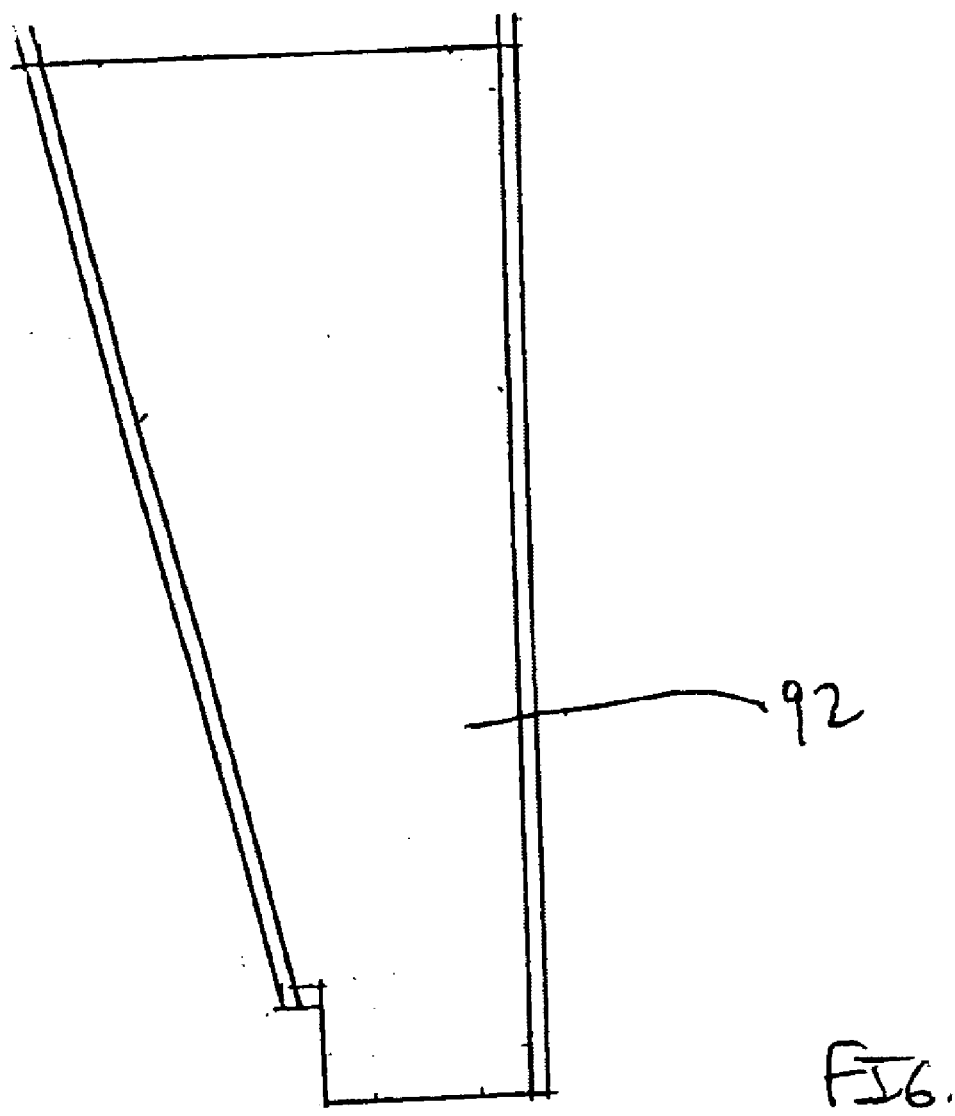
FIG. 14 is an end view illustrating a front end cap of the mechanical damping system, constructed in accordance with the present invention.
Figure 15:
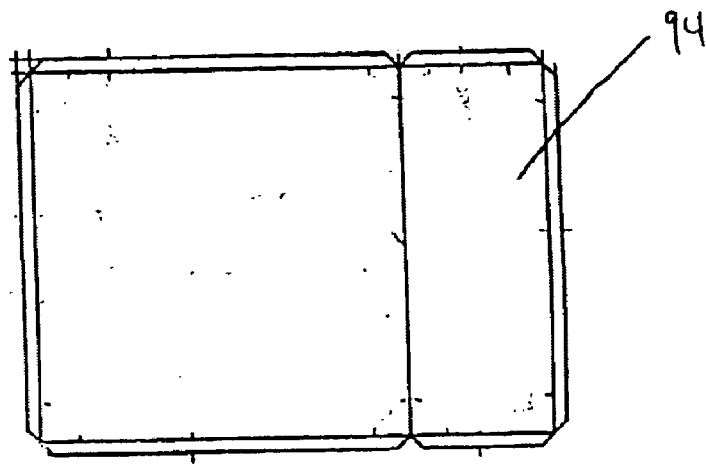
FIG. 15 is an end view illustrating a rear end cap of the mechanical damping system, constructed in accordance with the present invention.
Figure 16:
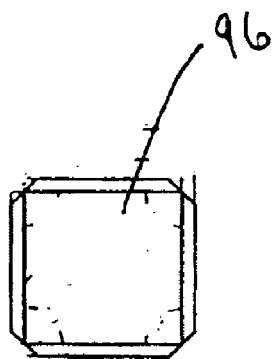

As illustrated in FIG. 10, the mechanical damping system 10 includes two stabilizing bars 79 connecting the impact frame 42 to the support frame 12. Preferably, each stabilizing bar 79 is constructed from metal having a thickness of approximately one-eighth (⅛") inch, a width of approximately two (2") inches, and a length of approximately two (2') feet, ten and three-fourths (10¾") inches although constructing the stabilizing bars 79 from a different material having a thickness greater than or less than approximately one-eighth (⅛") inch, a width greater than or less than approximately two (2") inches, and a length greater than or less than approximately two (2') feet, ten and three-fourths (10¾") inches is within the scope of the present invention.

As illustrated in FIGS. 11 and 12, the mechanical damping system 10 includes an elongated member 80 and an impact mass 82. The elongated member 80 has a first elongated end 84 and a second elongated end 86 with the first elongated end 84 secured to the support 78 with set screws or other securement means. The impact mass 82 is secured to the second elongated end 86 of the elongated member 80 and positioned within the impact frame 42 for contacting the impact frame 42 upon movement of the traffic signal structure 11. The elongated member 80 is preferably a strand member constructed from a 7-wire prestressing strand having an ultimate strength of approximately 270 ksi. The inventors of the present application have determined that the strands of the 7-wire prestressing strand tend to rub against each other during movement thereby providing additional damping effect.

It should be noted that other types of elongated member 80 are within the scope of the present invention. For instance, the elongated member 80 can be constructed from a single or multiple strands or wires, a solid singular member, or a tubular member which meets the necessary stiffness requirements to extend from the support 78 to a point within the impact frame 42.

In addition, preferably, the elongated member 80 has a length of approximately three (3') feet, five and three-eighths (5⅜") inches although the final length of the elongated member 80 is determined by the distance between the impact frame 42 and the support 78.

It should be noted that while the inclination angle of the support 78 and the length of the elongated member 80 has been described as above, the proper ratio of the length of the elongated member 80 and angle of inclination of the support 72 to the impact mass 82 is actually determined by the desired period and dead-load deflection. While these numbers are determined experimentally, it is desired to match the period as closely as possible to the estimated period of the traffic signal structure 11 taking into account the additional mass of the mechanical damper system 10. The dead-load deflection can be altered to conceal the majority of the mechanical damper system 10 behind the mast arm 14 once installed thereon.

The impact mass 82 is secured to the second strand end 86 of the elongated member 80, as described above, with cable clamps 88 or the like. The impact mass 82 can be a solid mass or can comprise more than one component. Preferably, the impact mass 82 has a substantially circular cross-sectional configuration with a diameter of approximately three (3") inches. An impact mass aperture 90 is formed through the impact mass 82 for receiving the second strand end 86 of the elongated member 80. It should be noted that it is within the scope of the present invention for the impact mass 82 to have any cross-sectional configuration including, but not limited to, oval, square, rectangular, etc.

As illustrated in FIGS. 13–16, the mechanical damping system 10 of the present invention includes a galvanized steel casing 92 enclosing the impact frame 42, the structural tube 76, the elongated member 80, and the impact mass 82 for improved sound proofing and aesthetic purposes. A first end cap 94 and a second end cap 96 can be secured to the casing 92 thereby further enclosing the impact frame 42, the structural tube 76, the elongated member 80, and the impact mass 82.

A rubber coating or other damping means can be applied to the impact mass 82 and/or the steel casing 92 to reduce the magnitude of noise produced and increase energy dissipation. The rubber coated impact mass 82 offers a better coefficient of restitution than steel-to-steel impacts and provides a higher level of inelastic deformations.

It should be noted that all parts of the mechanical damping system 10 possess a minimum of forty six (46) ksi yield strength. Lock washers can be added at all bolted connections including the bolted attachment of the steel sheet casing 92 and in the cable clamps 88.

Assembly of the mechanical damping system 10 of the present invention will not be described. As understood by those persons skilled in the art, the following description is merely one manner of assembly and other manners of assembly are within the scope of the present invention.

Assembly Procedure

1. Fabrication and acquisition of all parts.
2. Individual assembly of support frame 12 with the impact frame 42 and the second support frame 12' with the structural tube 76 using bolted connections.
3. Welding at all necessary locations on the support frames 12, 12', the impact frame 42, and the structural tube 76 with the exception of the two one-eighth (⅛") inch by two (2") inch stabilizing bars 79. Presences of all bolts from step 2 insure proper alignment of the parts during welding.
4. Secure impact masses 82 to the second strand end 86 of the prestressing elongated member 80 using the cable clamps 88.
5. Apply rubber coating to the impact masses 82 and/or the inside of the impact frame 42.
6. Insert the first strand end 84 of the elongated member 80 into the support 78 and lock in place with one-quarter (¼") inch set screws.
7. Clamp support frame 12 with the impact frame 42 and the second support frame 12' with the structural tube 76 to a common straight surface, i.e., a table, separating the impact frame 42 and the structural tube 76 by a predetermined distance.
8. Insure that the support frames 12, 12' are parallel to one another, and that the vertical inside surfaces of the support frames 12, 12' (location where the mast arm 14 shall be received) are equidistant from the straight surface.
9. Attach the one-eighth (⅛") inch by two (2") inch stabilizing bars 79. Location is not critical as the stabilizing bars 79 are present to resist moment imposed by the impact mass 82 and the elongated member 80, and to maintain proper distance between the two support frames 12, 12'.
10. Clamp in place three-sided steel sheeting casing 92 and small (first) end cap 94 on the two support frames 12, 12'. The sheeting casing 92 should fit the top, outside (side opposite the mast arm connection area), and bottom of the device. The first end cap 94 should overlap the sheeting casing 92.
11. Drill two holes equally spaced in each of the three sides of both support frames 12, 12' covered with sheeting casing 92 for one-quarter (¼") inch taps. This step insures alignment of the holes in the sheeting and those in the support frames 12, 12'.
12. Remove steel sheeting casing 92 and first end cap 94 and slightly oversize holes in sheeting casing 92 for one-quarter (¼") inch bolts.
13. Tap holes in support frames 12, 12' to receive one-quarter (¼") inch bolts (A307 or higher grade). Bolts should be a minimum of one-half (½") inch in length.
14. Reapply sheeting casing 92 and first end cap 94 and bolt in place.
15. Apply large (second) end cap 96 and side panel sheet casing 92 to the device. One-half (½") inch overlaps of these two pieces should be placed on the exterior of the three-sided piece and small (second) end cap 96.
16. Space holes in overlaps for sheet metal screws at a maximum spacing of three (3") inches with maximum spacing at edges of one and one-half (1½") inches.
17. Secure large (second) end cap 96 to the device with sheet metal screws. Interior side panel will be applied in the field.

Installation of the mechanical damping system 10 of the present invention will not be described. As understood by those persons skilled in the art, the following description is merely one manner of installation and other manners of installation are within the scope of the present invention. For instance, a clamp system can be incorporated without the need for drilling.

Installation Procedure

1. Place mechanical damping system 10 on mast arm 14 as close to the tip of the mast arm 14 as possible.
2. Place a level across the top of the front (large end) in the out-of-plane direction. This should be done near the bolts in the top of the impact frame 42 to avoid flaws in the sheet metal casing 92.
3. Once level, mark the locations of the four (4) bolt holes aligned to penetrate the mast arm 14. The threaded bar stock of the curved rod member 16 can be used to hold the system 10 in place during this step.
4. Remove the mechanical damping system 10.
5. Drill slightly oversized holes to receive one-half (½") inch bolts at the four (4) locations on the mast arm 14.
6. Reapply the mechanical damping system 10 and completely tighten the four bolts making sure all bolts properly align with the holes in the mast arm 14.
7. Secure the two sections of the threaded bar stock 16 making sure all lock washers collapse completely.
8. Apply the interior side panel of steel sheeting casing 92 and secure with sheet metal screws.

As noted, the installation of the mechanical damping system 10 by two people is relatively simple and easy.

Tuning Process

The mechanical damping system 10 of the present invention can be "tuned" to have a natural period very close to that of the traffic signal structure 11. The mechanical damping system 10 can be tuned to the traffic signal structure's 11 natural period by adjusting the position of the impact mass 82 along the elongated member 80 and/or by adjusting the size and/or weight of the impact mass 82. For fine tuning, washers can be positioned on the second strand end 86 adjacent the impact mass 82.

The natural period of a given structure is simply determined in an experimental manner by counting a set number of cycles and recording the time required. Counting at least ten cycles is recommended. The natural period is computed by dividing the time required by the number of cycles. Both in-plane and out-of-plane periods can be determined in this manner. As these natural periods are typically close to the same value, the average of the two may be used to establish the target frequency for the mechanical damping system 10.

For the mechanical damping system 10, the natural period is directly related to the static dead-load deflection. A preliminary strand length and angle of support inclination are chosen to provide the desired dead-load deflection. These settings can be provided in a tabular format. Final tuning is achieved by displacing the tuning mass and determining its natural period. A similar procedure as used for the traffic signal structure 11 is used. The length of strand and angle of support inclination are then adjusted to either increase or decrease (tune) the natural period to the target frequency. The natural period of the mechanical damping system 10 is again determined and the process is repeated until the target natural period and static dead-load deflection are achieved.

The mechanical damping system 10 of the present invention operates as a tuned-mass damper under relatively low excitation of the retrofit structure, and as a tuned-mass and impact damper when high excitation and resulting responses are present. As the traffic signal structure 11 moves, the elongated member 80 and the impact mass 82 moves to counter the traffic signal structure 11 movements. For small movements, the inherent damping in the elongated member 80 and the impact mass 82 is sufficient to counter the movement. For larger movements, the impact mass 82 actually contacts the impact frame 42 to further control and counter traffic signal structure 11 movements. As described above, the rubber coating reduces the magnitude of noise produced between the impact mass and the impact frame 42 and increases energy dissipation.

The mechanical damping system 10 of the present invention is capable of providing additional damping in multiple directions, i.e., increased damping in multiple modes. Furthermore, the mechanical damping system 10 has been designed to prevent yield of any of the primary framing members under assumed service conditions. The results for the mechanical damping system 10 show that the mechanical damper system 10 of the present invention performs extremely well in both the in-plane and out-of-plane directions.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A mechanical damping system for a structure, the mechanical damping system comprising:
    a tubular impact frame secured to the structure;
    a support frame secured to the structure, the support frame spaced from the impact frame;
    an elongated member having a first end and a second end, the first end secured within the support frame and the second end being free from connection and extending into the impact frame; and
    at least one impact mass secured to the second end of the elongated member, the impact mass movable within and contactable with the impact frame;
    wherein the impact frame is constructed in a continuous tube configuration having uniform thickness and width and being free from gaps.

2. The mechanical damping system of claim 1, and further comprising:
    dampening material secured within the impact frame.

3. The mechanical damping system of claim 1, and further comprising:
    dampening material surrounding at least a portion of the impact mass.

4. The mechanical damping system of claim 1 wherein the impact frame has a cross-sectional configuration selected from the group consisting of square, rectangular, round, and oval.

5. The mechanical damping system of claim 1 and further comprising:
    a plurality of impact masses secured to and selectively adjustably movable along the second free end of the elongated member.

6. The mechanical damping system of claim 1, and further comprising:
a casing surrounding the impact frame and the support frame.

7. The mechanical damping system of claim 1 wherein the combined elongated member and impact mass are tunable to substantially the same natural frequency of the structure.

8. The mechanical damping system of claim 1 and further comprising:
at least one stabilizing bar secured between the impact frame and the support frame.

9. The mechanical damping system of claim 1 wherein the elongated member is a strand member.

10. The mechanical damping system of claim 9 wherein the strand member is a multi-wire prestressing strand.

11. A damping device for omni directional damping of movement of a structure, the damping device comprising:
an impact frame secured to the structure and providing substantially uniform stiffness characteristics and impact properties in in-plane and out-of-plane directions; and
a damping mechanism for countering movement of the structure, the damping mechanism being secured on a first end and free from contact on a second end, the second end of the damping mechanism contactable with the impact frame upon movement of the structure;
wherein the impact frame in constructed in a continuous tube configuration having uniform thickness and width and being free from gaps.

12. The damping device of claim 11 wherein the impact frame is tubular having a cross-sectional configuration selected from the group consisting of square, rectangular, round, and oval.

13. The damping device of claim 11 wherein the damping mechanism includes an elongated member having a first end and a second end and at least one impact mass secured to the second end of the elongated member, the impact mass contactable with the impact frame.

14. The damping device of claim 13 wherein the elongated member is a strand member.

15. The damping device of claim 14 wherein the strand member is a multi-wire prestressing strand.

16. The damping device of claim 13, and further comprising:
a support frame secured to the structure, the support frame spaced from the impact frame;
wherein the first end of the elongated member is secured within the support frame and the second end being free from securement and extending into the impact frame.

17. The damping device of claim 13 and further comprising:
a plurality of impact masses secured to and movable along the second free end of the elongated member.

18. The damping device of claim 11, and further comprising:
dampening material secured within the impact frame.

19. The damping device of claim 11, and further comprising:
dampening material surrounding at least a portion of the dampening mechanism.

20. The damping device of claim 11, and further comprising:
a casing surrounding the impact frame and the dampening mechanism.

21. The damping device of claim 11 wherein the damping mechanism is tunable to substantially the same natural frequency of structure.

22. A method for damping the movement of a structure in both in-plane and out-of-plane directions, the method comprising:
securing an impact frame to the structure, the impact frame having substantially uniform stiffness characteristics and impact properties in in-plane and out-of-plane directions;
constructing the impact frame in a continuous tube configuration having uniform thickness and width and being free from gaps;
providing a damping mechanism, the damping mechanism having a first end and a second end;
securing the first end of the damping mechanism to the structure;
allowing the second end of the damping mechanism to move into and out of contact with the impact frame; and
countering movement of the structure with movement of the damping mechanism, the second end of the damping mechanism contactable with the impact frame.

23. The method of claim 22, and further comprising:
contacting the impact frame with the damping mechanism upon movement of the structure.

24. The method of claim 22 wherein the damping mechanism includes an elongated member having a first end and a second end and at least one impact mass secured to the second end of the elongated member, the impact mass contactable with the impact frame.

25. The method of claim 24 wherein the elongated member is a strand member.

26. The method of claim 25 wherein the strand member is a multi-wire prestressing strand.

27. The method of claim 24, and further comprising:
securing a support frame to the structure spaced from the impact frame;
securing the first end of the elongated member within the support frame; and
extending the second end of the elongated member into the impact frame.

28. The method of claim 22, and further comprising:
securing dampening material within the impact frame.

29. The method of claim 22, and further comprising:
surrounding at least a portion of the dampening mechanism with dampening material.

30. The method of claim 22, and further comprising:
surrounding the impact frame and the dampening mechanism with a casing.

31. The method of clam 22, and further comprising:
tuning the combined elongated member and impact mass to substantially the same natural frequency of structure.

32. In combination:
a vertical pole member;
a mast arm secured to and extending laterally from the pole member for supporting traffic signals and the like;
a tubular impact frame secured to the mast arm;
a support frame secured to the mast arm, the support frame spaced from the impact frame;
an elongated member having a first end and a second end, the first end secured to the support frame and the second end being free from connection and extending into the impact frame; and
at least one impact mass secured to the second end of the elongated member, the impact mass contactable with the impact frame;

wherein the impact frame is constructed in a continuous tube configuration having uniform thickness and width and being free from gaps.

33. The combination of claim 32, and further comprising: dampening material secured within the impact frame.

34. The combination of claim 32, and further comprising: dampening material surrounding at least a portion of the impact mass.

35. The combination of claim 32 wherein the impact frame has a cross-sectional configuration selected from the group consisting of square, rectangular, round, and oval.

36. The combination of claim 32 and further comprising: a plurality of impact masses secured to and selectively adjustably movable along the second free end of the elongated member.

37. The combination of claim 32, and further comprising: a casing surrounding the impact frame and the support frame.

38. The combination of claim 37 wherein the casing is positioned on a far side of the mast arm so that the casing is substantially hidden from an approaching driver.

39. The combination of claim 32 wherein the combined elongated member and impact mass are tunable to substantially the same natural frequency of the structure.

40. The combination of claim 32 and further comprising: at least one stabilizing bar secured between the impact frame and the support frame.

41. The combination of claim 32 wherein the elongated member is a strand member.

42. The combination of claim 41 wherein the strand member is a multi-wire prestressing strand.

43. A mechanical damping system for a structure, the mechanical damping system comprising:
a tubular impact frame secured to the structure;
a support frame secured to the structure, the support frame spaced from the impact frame;
an elongated member having a first end and a second end, the first end secured within the support frame and the second end being free from connection and extending into the impact frame;
at least one impact mass secured to the second end of the elongated member, the impact mass movable within and contactable with the impact frame; and
dampening material secured within the impact frame.

44. A mechanical damping system for a structure, the mechanical damping system comprising:
a tubular impact frame secured to the structure;
a support frame secured to the structure, the support frame spaced from the impact frame;
an elongated member having a first end and a second end, the first end secured within the support frame and the second end being free from connection and extending into the impact frame;
at least one impact mass secured to the second end of the elongated member, the impact mass movable within and contactable with the impact frame; and
dampening material surrounding at least a portion of the impact mass.

45. A mechanical damping system for a structure, the mechanical damping system comprising:
a tubular impact frame secured to the structure;
a support frame secured to the structure, the support frame spaced from the impact frame;
an elongated member having a first end and a second end, the first end secured within the support frame and the second end being free from connection and extending into the impact frame;
at least one impact mass secured to the second end of the elongated member, the impact mass movable within and contactable with the impact frame; and
a plurality of impact masses secured to and selectively adjustably movable along the second free end of the elongated member.

46. A mechanical damping system for a structure, the mechanical damping system comprising:
a tubular impact frame secured to the structure;
a support frame secured to the structure, the support frame spaced from the impact frame;
an elongated member having a first end and a second end, the first end secured within the support frame and the second end being free from connection and extending into the impact frame;
at least one impact mass secured to the second end of the elongated member, the impact mass movable within and contactable with the impact frame; and
a casing surrounding the impact frame and the support frame.

47. A mechanical damping system for a structure, the mechanical damping system comprising:
a tubular impact frame secured to the structure;
a support frame secured to the structure, the support frame spaced from the impact frame;
an elongated member having a first end and a second end, the first end secured within the support frame and the second end being free from connection and extending into the impact frame;
at least one impact mass secured to the second end of the elongated member, the impact mass movable within and contactable with the impact frame; and
at least one stabilizing bar secured between the impact frame and the support frame.

48. A damping device for omni directional damping of movement of a structure, the damping device comprising:
an impact frame secured to the structure and providing substantially uniform stiffness characteristics and impact properties in in-plane and out-of-plane directions;
a damping mechanism for countering movement of the structure, the damping mechanism being secured on a first end and free from contact on a second end, the second end of the damping mechanism contactable with the impact frame upon movement of the structure, the damping mechanism includes an elongated member having a first end and a second end and at least one impact mass secured to the second end of the elongated member, the impact mass contactable with the impact frame; and
an elongated member, a plurality of impact masses secured to and movable along the second free end of the elongated member.

49. A mechanical damping device for omni directional damping of movement of a structure, the damping device comprising:
an impact frame secured to the structure and providing substantially uniform stiffness characteristics and impact properties in in-plane and out-of-plane directions;
a damping mechanism for countering movement of the structure, the damping mechanism being secured on a first end and free from contact on a second end, the second end of the damping mechanism contactable with the impact frame upon movement of the structure; and dampening material secured within the impact frame.

50. A mechanical damping device for omni directional damping of movement of a structure, the damping device comprising:

an impact frame secured to the structure and providing substantially uniform stiffness characteristics and impact properties in in-plane and out-of-plane directions;

a damping mechanism for countering movement of the structure, the damping mechanism being secured on a first end and free from contact on a second end, the second end of the damping mechanism contactable with the impact frame upon movement of the structure; and dampening material surrounding at least a portion of the dampening mechanism.

51. A mechanical damping device for omni directional damping of movement of a structure, the damping device comprising:

an impact frame secured to the structure and providing substantially uniform stiffness characteristics and impact properties in in-plane and out-of-plane directions;

a damping mechanism for countering movement of the structure, the damping mechanism being secured on a first end and free from contact on a second end, the second end of the damping mechanism contactable with the impact frame upon movement of the structure; and a casing surrounding the impact frame and the dampening mechanism.

52. A method for mechanically damping the movement of a structure in both in-plane and out-of-plane directions, the method comprising:

securing an impact frame to the structure, the impact frame having substantially uniform stiffness characteristics and impact properties in in-plane and out-of-plane directions;

providing a damping mechanism, the damping mechanism having a first end and a second end;

securing the first end of the damping mechanism to the structure;

allowing the second end of the damping mechanism to move into and out of contact with the impact frame;

countering movement of the structure with movement of the damping mechanism, the second end of the damping mechanism contactable with the impact frame; and securing dampening material within the impact frame.

53. A method for mechanically damping the movement of a structure in both in-plane and out-of-plane directions, the method comprising:

securing an impact frame to the structure, the impact frame having substantially uniform stiffness characteristics and impact properties in in-plane and out-of-plane directions;

providing a damping mechanism, the damping mechanism having a first end and a second end;

securing the first end of the damping mechanism to the structure;

allowing the second end of the damping mechanism to move into and out of contact with the impact frame;

countering movement of the structure with movement of the damping mechanism, the second end of the damping mechanism contactable with the impact frame; and surrounding at least a portion of the dampening mechanism with dampening material.

54. A method for mechanically damping the movement of a structure in both in-plane and out-of-plane directions, the method comprising:

securing an impact frame to the structure, the impact frame having substantially uniform stiffness characteristics and impact properties in in-plane and out-of-plane directions;

providing a damping mechanism, the damping mechanism having a first end and a second end;

securing the first end of the damping mechanism to the structure;

allowing the second end of the damping mechanism to move into and out of contact with the impact frame;

countering movement of the structure with movement of the damping mechanism, the second end of the damping mechanism contactable with the impact frame; and surrounding the impact frame and the dampening mechanism with a casing.

55. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame;

at least one impact mass secured to the second end of the elongated member, the impact mass contactable with the impact frame; and dampening material secured within the impact frame.

56. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame;

at least one impact mass secured to the second end of the elongated member, the impact mass contactable with the impact frame; and dampening material surrounding at least a portion of the impact mass.

57. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame;

at least one impact mass secured to the second end of the elongated member, the impact mass contactable with the impact frame; and a plurality of impact masses secured to and selectively adjustably movable along the second free end of the elongated member.

58. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame;

at least one impact mass secured to the second end of the elongated member, the impact mass contactable with the impact frame; and a casing surrounding the impact frame and the support frame.

59. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame;

at least one impact mass secured to the second end of the elongated member, the impact mass contactable with the impact frame; and at least one stabilizing bar secured between the impact frame and the support frame.

60. A mechanical damping system for a structure, the mechanical damping system comprising:

a tubular impact frame secured to the structure;

a support frame secured to the structure, the support frame spaced from the impact frame;

an elongated member having a first end and a second end, the first end secured within the support frame and the second end being free from connection and extending into the impact frame; and at least one impact mass secured to the second end of the elongated member, the impact mass movable within and contactable with the impact frame;

wherein the impact frame has a cross-sectional configuration selected from the group consisting of round and oval.

61. A damping device for omni directional damping of movement of a structure, the damping device comprising:

an impact frame secured to the structure and providing substantially uniform stiffness characteristics and impact properties in in-plane and out-of-plane directions;

a damping mechanism for countering movement of the structure, the damping mechanism being secured on a first end and free from contact on a second end, the second end of the damping mechanism contactable with the impact frame upon movement of the structure, the damping mechanism includes an elongated member having a first end and a second end and at least one impact mass secured to the second end of the elongated member, the impact mass contactable with the impact frame;

wherein the impact frame is tubular having a cross-sectional configuration selected from the group consisting of round and oval.

62. In combination:

a vertical pole member;

a mast arm secured to and extending laterally from the pole member for supporting traffic signals and the like;

a tubular impact frame secured to the mast arm;

a support frame secured to the mast arm, the support frame spaced from the impact frame;

an elongated member having a first end and a second end, the first end secured to the support frame and the second end being free from connection and extending into the impact frame; and at least one impact mass secured to the second end of the elongated member, the impact mass contactable with the impact frame;

wherein the impact frame has a cross-sectional configuration selected from the group consisting of round and oval.

* * * * *